Scuricini

[11] 4,096,988
[45] Jun. 27, 1978

[54] METHOD AND AN APPARATUS FOR THE DYNAMIC BALANCING OF ROTATING BODIES, PARTICULARLY FOR CENTRIFUGES

[75] Inventor: Giovan Battista Scuricini, Rome, Italy

[73] Assignee: Comitato Nazionale per l'Energia Nucleare, Rome, Italy

[21] Appl. No.: 750,455

[22] Filed: Dec. 14, 1976

[30] Foreign Application Priority Data

Dec. 16, 1975 Italy .................. 52710 A/75

[51] Int. Cl.² .................................. B04B 9/14
[52] U.S. Cl. .................. 233/23 A; 233/1 C; 74/573 R; 415/119
[58] Field of Search ............ 233/1 R, 1 B, 1 C, 23 A; 64/1 V, 1 R; 33/84; 74/573, 574, 5.6 A; 415/119

[56] References Cited

U.S. PATENT DOCUMENTS

| 829,251 | 8/1906 | Booraem | 74/573 |
| 2,856,778 | 10/1958 | Kiebert | 74/5.6 A |
| 3,226,016 | 12/1965 | Couper et al. | 233/23 A |

FOREIGN PATENT DOCUMENTS

| 2,306,017 | 10/1976 | France | 235/1 R |
| 1,120,762 | 12/1961 | Germany | 74/573 |

*Primary Examiner*—George H. Krizmanich
*Attorney, Agent, or Firm*—Cushman, Darby & Cushman

[57] ABSTRACT

A method and apparatus for the dynamic balancing of a centrifuge during rotation in which vibration, amplitude, frequency and phrase are sensed within at least two planes and vibration signals produced. The vibration signals are then processed and converted into piloting signals which are used to vary the mass of the centrifuge.

20 Claims, 7 Drawing Figures

METHOD AND AN APPARATUS FOR THE DYNAMIC BALANCING OF ROTATING BODIES, PARTICULARLY FOR CENTRIFUGES

This invention relates to a method and an apparatus for carrying out the dynamic balancing of bodies rotating at any speed. The invention is particularly suitable for the automatic dynamic balancing of centrifuges and especially ultracentrifuges.

The balancing problems of rotating bodies and especially ultracentrifuges, having peripheral speeds of 300 m/sec or more, are particularly delicate, because it is no longer possible to consider the rotating body as a rigid and indeformable one.

The following specification relates to the particular case of a gas ultracentrifuge, but more generally it is applicable to any rotating body, even at a reduced speed, and is not to be deemed limitative but only as illustrative, in order to give the problem a physical dimension.

For instance, the planning of a subcritical ultracentrifuge of the so-called Zippe type is conceived, as is well-known, so that the rotation of the body about the main axis of inertia is assured even if this axis does not exactly coincide with the geometrical axis; in fact, the bearing and centering means are of a very particular type which allows the body to keep rotating about an axis which is generally vertical even if radial shifts of the two ends amounting to 1 mm are present; the centering forces which can be exerted by said bearing means are generally of the order of a few kg. For instance, at peripheral speeds of the order of 600 m/sec, the accelerations at the periphery are in the order of $0.5 \cdot 10^5 g$. Therefore, at such speeds, peripheral masses in the order of the milligram cause forces in the order of 0.5 kg.

Consequently, in order to restrict the stresses in the bearing means to the aforesaid limits, the rotors should be balanced with precisions of the order of 5-10 milligrams-mass referred to the periphery, corresponding to volumes of 1-2 mm$^3$. Considering that the rotor surface of an ultracentrifuge of the aforesaid Zippe type is in the order of 0.7 m$^2$, to respect the mass tolerances over the whole surface, this surface should be machined with precisions without technological sense.

As an example of application, in the particular case of ultracentrifuges having a metallic rotor with a thin wall (0.2-0.5 mm), for manufacturing said rotors there are adopted processes which allow very rigid centering tolerances to be observed within a limited rotor length, assuring the concentricity of the several elements.

However, this technique cannot always be adopted, as for instance in the case of rotors of composite materials (fiber glass, carbon or boron fiber and epoxy resins) with a thick wall (1-5 mm), obtained by means of filament winding processes.

Therefore it is difficult to achieve and maintain adequate eccentricity tolerances only in the manufacturing stage of the tubular element.

Considering that the rotating body comprises, besides a cylindrical member, other elements as well (end bottoms, inner disks, etc.), which are more difficult to produce with the due tolerances, one can recognize the advantage of balancing the assembled rotor.

This operation is comparatively easy for subcritical rotors intended to rotate at low speed.

In such a case, as is well-known, if damped bearing systems are not provided, the center of gravity of the rotating body is aligned with its center of rotation and with its geometrical center, and the latter is interposed between the first two centers. Consequently the eccentricity is in phase with the deformation, and thus by determining the vibrations at the bearings, or the deformations of the rotating body, it is possible to establish the position and the amount of the unbalancing mass. A number of static and dynamic balancing machines, at present in use, are based on the application of these properties. Thus, in a subcritical centrifuge the deformations increase as the speed of rotation increases up to the so-called critical speed, so that they would theoretically tend to infinite; on the contrary, in a supercritical centrifuge, supported by rigid bearings, while the center of gravity, the center of rotation and the geometrical center are still aligned, the center of gravity is however interposed between the geometrical center and the center of rotation, so that as the speed increases the amount of deformations decreases; in fact, the supercritical centrifuge is called self-centering. In this case the question of the balancing at the operating condition would seem less important than the subcritical case, taking into account the aforesaid self-centering phenomenon; however, it is to be appreciated that, in order to obtain a correct separating working of the ultracentrifuge, the center of gravity must always coincide, as much as possible, with the geometrical center, and so also in the supercritical case an accurate balancing is required.

For rotors intended to rotate at very high peripheral speeds, the difficulties of carrying out this balancing become more and more serious for the following reasons:

The balancing effected at low speed, generally under 3000 r.p.m. for staff security reasons, with commercial balancing machines does not allow the eccentricity to be reduced to the values required for high speed rotating bodies. According to the subdivision of Federn K (Werkstatt und Betrieb 86:243 (1953); see also: D. Muster: Balancing of rotating Machinery, page 39.20 in Shock and Vibration Handbook, Harris & Crede - McGraw-Hill 1961) for the class A (ultracentrifuges, gyroscopes) the eccentricity of the center of gravity must be less than 1 $\mu$; for flexible rotors, balancing in two planes is valid only at the speed of rotation at which the balancing is carried out. If the operating speed is higher than "critical speed I", balancing in two planes is no longer sufficient; therefore, it must be carried out in three planes. If the speed is between critical speed II and III, the balancing must be accomplished in five planes. If the rotor is deformable, for instance because of the centrifugal forces and Poisson's modulus effects, in a non-axial-symmetrical way, the balancing must be carried out at the operating speed.

In the case of gas ultracentrifuges for speeds above 400 m/sec, for the tubular rotor the aforementioned composite material (for instance epoxy resin, carbon fiber) must be adopted. In this case it is difficult to obtain a structural uniformity such that the rotor is not deformed in a non-axialsymmetrical way at the operating speed. This deformation causes bearing vibrations which increase monotonously with the speed.

Moreover, for subcritical or supercritical rotors installed on dampening bearings, the mutual position of the center of rotation, the center of gravity and the geometrical center is no longer well defined as in the case of rotors without damped bearing systems; in other words, in the case of dampening bearings, the three above-mentioned centers are no longer aligned and this complicates the setting of the eccentricity angle.

Thus, from the foregoing it is clear that for ultrarapid rotors (peripheral speeds above 400–450 m/sec), it is required to resort to balancing operations in the conditions as close as possible to the operating speeds and particularly at speeds as much as possible close to the running speeds.

However, this procedure is extremely long and expensive, also because the high speed rotors are generally maintained in a controled atmosphere, and for this reason the access to the system components involves, besides the machine stopping, its resetting in the open air and thus each balancing attempt may require some hours.

It is the object of this invention to obviate the above-mentioned long and expensive procedure of dynamic balancing of rotating bodies, i.e. to allow said balancing be effected in actual operating conditions, with no need to stop the rotating body and to reset it in the open air.

According to the invention, said object is achieved by using operations and means allowing pre-established amounts of material to be removed from the rotating body through melting or sublimation, or to be added to it, in predetermined positions, the rotating body being maintained within its own frame and at a running speed which may be close to that of the normal operating condition. For instance, said material removal can be obtained by using the radiant energy from a laser, by means of an electronic gun or an electric discharge device; said addition of material can be effected by means of ionisation, plasma jet or the like, or molecule beam gun. The material removal or addition is directly effected on the rotor surface or at least on one middle or end belt, ring or the like, or on one or two end disks, fixed to said body.

In further detail, the method according to this invention for the dynamic balancing of a rotating body while it is revolving within its own frame, wherein the vibration amplitude, frequency and phase of the rotating body are sensed at predetermined positions of said body, so that so-called vibration signals are produced, which are processed into piloting signals, comprises the step of operating with an intensity and/or a duration determined as a function of said piloting signals, emitting or sending means adapted to emit or send to said rotating body electromagnetic energy, electrons, ions or ionized molecules, in order to vary, through removal or addition of material, the mass of the rotating body, at the positions and periods of time, and thus in the quantity which are determined by said piloting signals.

According to a more elaborate embodiment, the method further comprises the steps of: generating a reference signal indicative of the angular position of the rotating body; and comparing the vibration signals with said reference signal and normalizing the signals as to phase and amplitude, said processing operation to obtain the piloting signals being then carried out on the signals obtained from said comparing and normalising step, while said signals obtained from the processing operation are also calibrated as to amplitude and phase.

The apparatus according to the invention, for accomplishing the method set forth, wherein sensing means disposed at predetermined positions of the rotating body sense its vibration amplitude, frequency and phase, so that the so-called vibration signals are produced, and processing means connected to the output of said vibration signals convert them into piloting signals, comprises emitting or sending means adapted to emit or send electromagnetic energy, electrons, ions or ionized molecules, the power circuit of said emitting or sending means being controlled by said piloting signals, said emitting or sending means being in such a position with respect to the rotating body as to act upon this body in order to vary its mass at the positions and time periods and thus in the quantity which are determined by said piloting signals.

According to a more elaborate embodiment, the apparatus further comprises generator means for generating a reference signal indicative of the angular position of the rotating body, and comparing means the inputs of which are connected to said sensing means and to said reference signal generating means, at the outputs of said comparing means appearing phase and anglitude normalized signals which allow the amplitude, frequency and phase of the vibrations to be determined, said processing means then receiving at their input the signals appearing at the outputs of said comparing means. Said processing means may further comprise manual amplitude and phase calibration means to influence the signals at the output of the processing means.

The advantages offered by the method and apparatus according to this invention are numerous and considerable; particularly it is possible to balance a flexible and deformable body while it is rotating at high speed within its own frame; it is further possible to compensate the vibrations caused by the non-axialsymmetrical deformations of the rotating body. Another advantage consists in the possibility of reducing the time and cost required for the balancing operation, which can be carried out by driving, only few times or even once, the body up to the high speed. A further advantage consists in the possibility of automating up to a very high level the process, so that a very high degree of uniformity in the product quality and reliability is assured. Still another advantage consists in the possibility of carrying out the balancing in several planes and in conditions like the operating conditions (damping systems, speed of rotation etc.), by experimentally determining the so-called influence coefficients. Another advantage consists in the fact that it is possible to effect the balancing operations in situ, on already installed machines, appropriately arranged. In particularly complicated cases, the method allows the balancing to be carried out easily at several progressively increasing speeds of rotation.

These and other advantages and features of this invention will result more clearly from the following description of some examples of embodiment, taken in conjunction with the appended drawings, in which.

Figures 1A, 1B, 2:
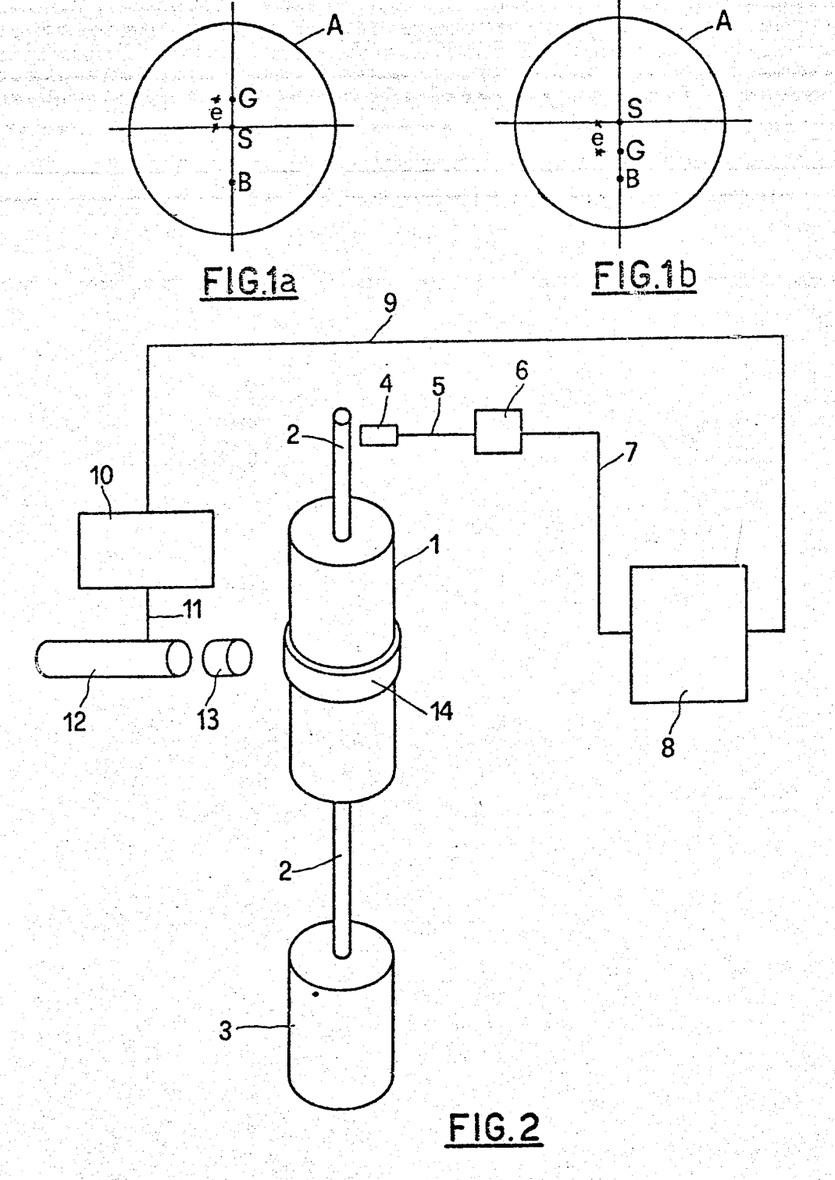
FIG. 1a and 1b show diagrams relating to subcritical rotors and supercritical rotors respectively.
FIG. 2 is a schematic view of a first embodiment of an apparatus according to the invention.

As above mentioned, it is known that in the case of subcritical rotors, intended to rotate at low speed, if there are not provided damped bearing systems, the center of gravity is aligned with the center of rotation and with the geometrical center; in FIG. 1a, A designates the contour of the rotor body; G, B and S are the center of gravity, the center of rotation and the geometrical center, respectively. As shown in FIG. 1a, in the subcritical rotors the geometrical center is interposed between the center of gravity and the center of rotation. Consequently, the eccentricity is in phase with the deformation, and by determining the vibrations on the bearings or the deformations of the rotor, it is possible to establish the position and amount of the unbalancing mass.

On the contrary, in the case of supercritical rotors (FIG. 1b), the center of gravity is interposed between the geometrical center and the center of rotation; a supercritical centrifuge is therefore self-centering; however, as above mentioned, also in the supercritical case an accurate balancing is required, because the center of gravity must in any way coincide as much as possible with the geometrical center.

In FIG. 2, which shows an example of utilization of a laser, the reference numeral 1 designates a cylindrical rotating rotor, suitably installed in bearing means (not shown); the shaft 2 of this rotor is caused to rotate by a motor 3. At the upper side of the shaft 2, a member 4 is disposed, which senses amplitude, frequency and phase of the vibrations of the rotor 1; the vibrations sensed by said sensing member 4 are transmitted, through a lead 5, to a transducer 6, which generates vibration signals as a function of said sensed vibrations.

Said transducer 6 is connected through a lead 7 to the input of a processing device 8, the output of which is connected, through a lead 9, to a power circuit 10; this circuit 10 controls through a lead 11 a laser device 12 with its associated collimator 13 being disposed against an annular belt or ring 14 fixed to the cylindrical body of the rotor 1.

The apparatus according to FIG. 2 substantially operates as follows:

The rotor 1 is caused to rotate at its normal operating speed and in a controlled atmosphere if necessary. The vibrations of the rotating body, as to amplitude, frequency and phase, caused by its mass eccentricity (as above mentioned, this eccentricity is unavoidable even with the most sophisticated manufacturing arts) generate at the output of the transducer 6 vibration signals which are processed in the processing device 8, to obtain at its output a piloting signal which controls the power circuit 10 of the laser device 12. Then the device 12 will illuminate by its emission beam the ring 14, integrally rotating with the rotor 1, so that a certain amount of material will be removed from this ring 14 directly through melting or sublimation, at the positions and within the time periods and so in the quantity determined by said piloting signal.

Some functions of the processing device 8 may be in certain cases replaced (in a manner not illustrated) by a manual operation which however is such as to allow the emission of a piloting signal which is fed through the lead 9 to the power circuit 10 of the laser device.

Figure 3:
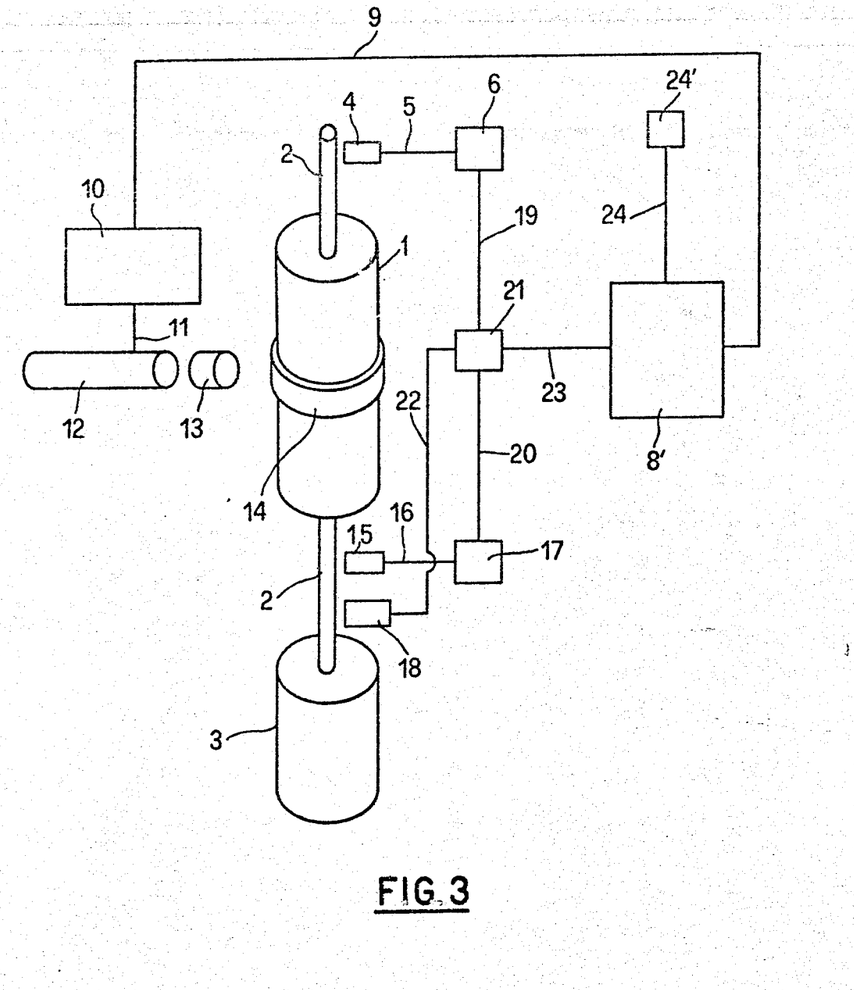
FIG. 3 is a schematic view of a second embodiment of an apparatus according to the invention.

In FIG. 3, members like those of FIG. 2 are indicated with the same reference numerals as in FIG. 2. In the embodiment according to FIG. 3, the vibration sensing means are two in number, i.e., the aforesaid means 4 and the means 15; the vibrations sensed as to amplitude, frequency and phase by the sensing means 15 are transmitted through a lead 14 to a transducer 17 which generates vibration signals corresponding to said sensed vibrations.

A signal generator for generating a reference signal indicative of the angular position of the rotating body is indicated with 18. The transducers 6 and 17 are connected through leads 19 and 20 to the inputs of a comparator 21, the other input of which is connected through a lead 22 to said reference signal generator 18; the output of the comparator 21 is connected by means of a lead 23 to an electronic processing device 8', which is further connected, through transmitting means 24, to a manual device 24' which allows the signals at the output from the processing device to be amplitude and phase calibrated.

The output of said processing device 8' is connected through the lead 9 to the power circuit 10 controlling the laser device 12 with its relative collimator 13.

The automatic dynamic balancing apparatus of FIG. 3 substantially operates as follows: the rotor 1, which for instance may be the rotor of an ultracentrifuge, is caused to rotate at its normal operating speed, in a controlled atmosphere. The vibrations of the rotating body caused by its mass eccentricity generate at the outputs of the transducers 6 and 17 vibration signals which are compared in the comparator 21 with the reference signal produced by the generator 18; at the comparator output, phase and amplitude normalized signals appear, which allow the amplitude, the frequency and the phase of the vibrations to be determined; these signals from the comparator output are processed by the processing device 8' suitably calibrated by means of the device 24', to obtain at the output of the processing device 8' a piloting signal controlling the power circuit 10. Consequently the laser device 12 will illuminate with its emitting beam the ring 14 in order to remove from it, directly through melting or sublimation, the proper amount of material.

Thus, in the most rapid and exact way and without having to stop the rotor, the apparatus according to this invention allows the mass eccentricity of the rotor to be eliminated, i.e. permits to carry out an exact dynamic balancing thereof.

It is clear that by means of the method and apparatus according to the invention, balancing on several planes may be easily carried out, and it is possible to adopt sophisticated balancing procedures, for instance by experimentally determining the influence coefficients. The use of a laser as a balancing instrument allows the widest choice of processing device type to be made. Thus, the complexity of the processing device will depend on the intended object and the desired level of automaticity of the process. In the simplest case of balancing in two planes, the usual techniques for measuring the degree of unbalance allow simple and effective processing devices to be produced, by means of suitable modifications to be hereinafter explained.

Figure 4:
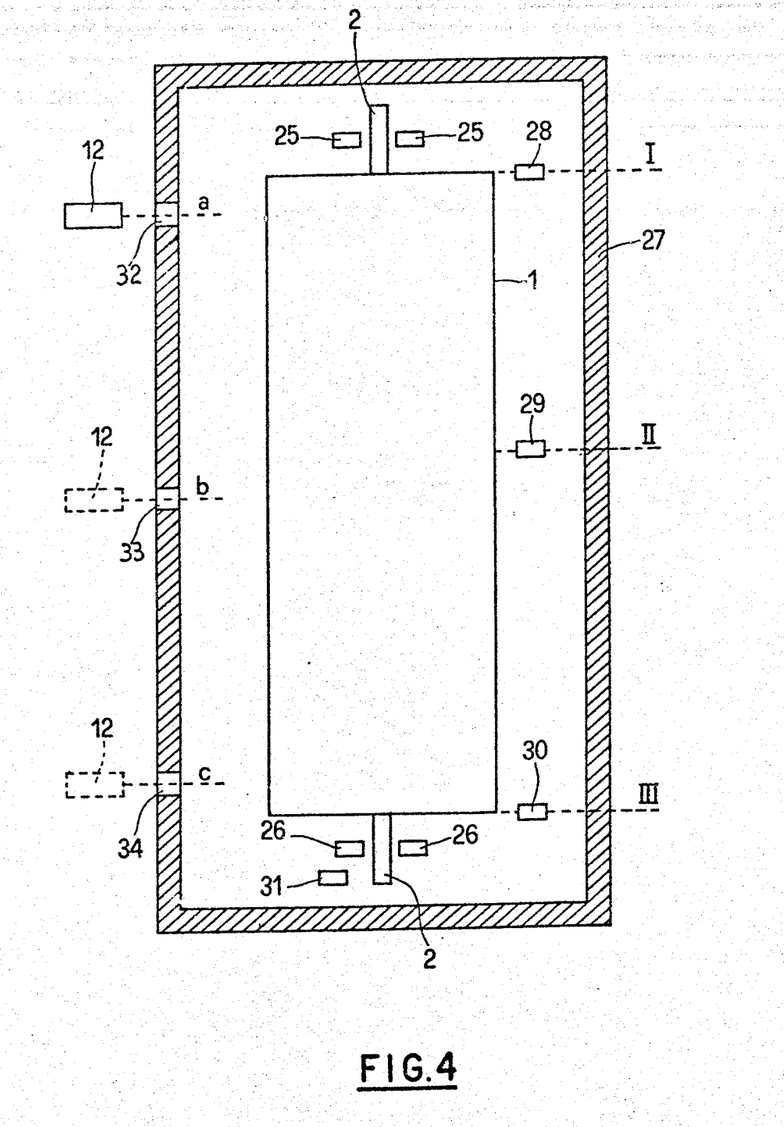
FIG. 4 is a schematic view of an arrangement of the sensing and operating means around the rotating body, in an apparatus according to the invention.

In FIG. 4 the cylindrical rotor and its shaft are again designated with 1 and 2; the shaft is supported by upper and lower bearings 25 and 26 respectively. The rotor housing is shown at 27; the three vibration sensing members in the planes I, II and II respectively, are designated with 28, 29 and 30; a signal generator for producing a reference signal indicative of the angular rotor position is designated with 31. The laser device 12 is adapted to be moved along the longitudinal length of the rotor 1 so as to be positioned at first, second or third slots 32, 33, 34, corresponding to three transverse planes a, b, c respectively.

It is known that, if balancing is effected in the planes a and b and the vibrations are sensed in the planes I and II, the vibrations $V_I$ and $V_{II}$ in the planes I and II, represented as to phase and amplitude by complex numbers, are:

$$V_I = a_{aI}U_a + a_{bI}U_b;\ V_{II} = a_{aII}U_a + a_{bII}U_b$$

wherein $U_a$, $U_b$ are the unbalances in the planes $a$ and $b$: $a_{ij}$ are the dynamic influence coefficients which may be real or complex numbers according to the bearing types and which represent vibrations induced into the plane $j$ by a unitary unbalance in the plane $i$; therefore the unbalance in the plane $a$ will be:

$$U_a = \frac{V_I a_{bII} - V_{II} a_{bI}}{aI\ bII - bI\ aII} = \frac{1}{\Delta}\ \frac{1}{a_{bII}}(V_I - \frac{a_{aII}}{a_{bII}} V_{II})$$

wherein $\Delta = a_{aI}a_{bII} - a_{bI}a_{aII}$. Consequently the unbalance in the plane $a$, apart from a proportionality coefficient, equals $$(V_I - \frac{a_{aII}}{a_{bII}} V_{II}).$$

Therefore, the processing device must be so carried out as to allow the following operative logic to be realized:
1. Reset.
2. Taking of the signal $V_I$ and $V_{II}$.
3. Multiplication of $V_{II}$ by $a_{aII}/a_{bII}$.
4. Subtraction $$V_I - \frac{a_{aII}}{a_{bII}} V_{II}.$$

5. Multiplication by $$\frac{1}{\Delta}\ \frac{1}{a_{bII}}$$

Having thus obtained the vector $U_a$ (magnitude and argument) the laser device will be piloted with an amplitude equal to the magnitude and with a phase equal to the argument.

Figure 5:
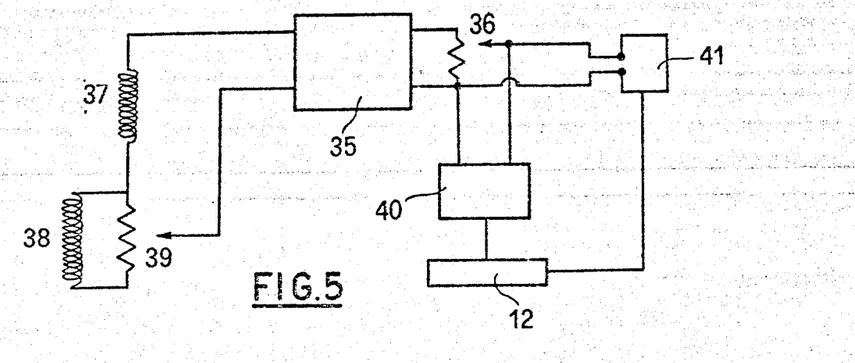
FIG. 5 is a schematic view of a processing device usable in the apparatus.

Analogue apparatus are already known and commonly used, which by means of transformers and potentiometers permit the system to be solved; referring to FIG. 5, there is shown for instance the matching of a known Gisholt-Westinghouse balancing device to the laser device according to the invention. In FIG. 5, the power circuit (not shown) of the laser device 12 is piloted by a processing device comprising an amplifier 35, a control potentiometer 36 multiplication by $$\frac{1}{\Delta}\ \frac{1}{a_{bII}}),$$

inputs 37 and 38 of the vibration signals $V_I$ and $V_{II}$ in push-pull way (subtraction), a control potentiometer 39 (multiplication by $a_{aII}/a_{bII}$), a phase control 40 and an amplitude control 41.

In order to free the signal of the vibration sensing members from the noise caused by other motions of the rotating body (precession, mutation) or by vibrations resulting from other factors, it may be useful to combine the vibration signal with a sinusoidal signal, such as that produced by a generator connected with the rotating body.

Figure 6:
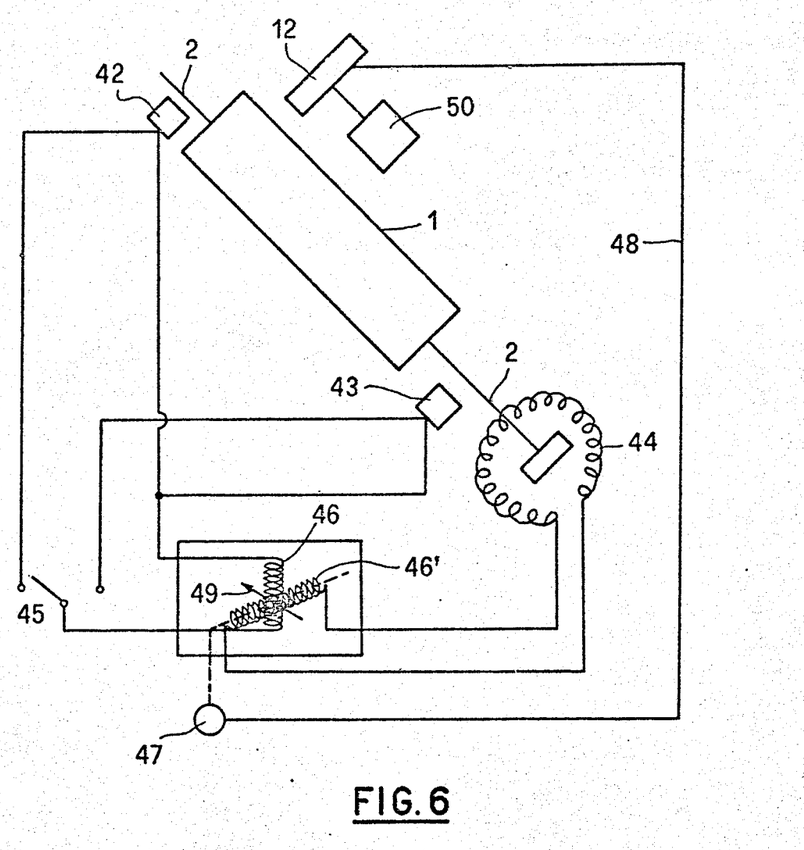
FIG. 6 is a schematic view of another usable processing device.

This combination may be accomplished by a usual technique (FIG. 6) through two coil windings of a wattmeter to which the vibration signals and the sinusoidal generator signal are fed respectively; thus it is possible to filter the vibration signal and to obtain, by varying the angle of the two windings, the magnitude and argument of the vibration signal in the different planes. In this case said angle may be varied manually or by means of an automatic system interlocked with the piloting circuit of the laser. Such a wattmeter system is schematically illustrated in FIG. 6, in which the rotor, the shaft of said rotor and the laser device are again designated with 1, 2 and 12. The vibration sensing members are shown at 42 and 43; the system further comprises a sinusoidal generator 44, connected with the shaft 2, a switch 45, two wattmeter coil windings 46 and 46', a phase control 47, a phase piloting member 48, an amplitude indicator 49 and an amplitude control 50 of the laser pulse, which will be manually operated according to the indication given by said indicator 49.

In the more complex case of flexible and deformable rotors, an electronic processor will be adopted, which allows the influence coefficients to be experimentally determined in actual operating conditions.

The following procedure may be adopted:
1. The body on which is fixed a reference angle of 0° is caused to rotate;
2. a sequence of laser shots of "unitary" intensity is effected in some planes ($a$, $b$, ...), with a predetermined phase relating to the reference, so sensing the variations of the vibrations at the planes I, II, ... in which the sensing members are positioned. Thus it will be possible to determine the influence coefficients; these coefficients will be real numbers in the case of rigid bearings or complex members in the more general case of elastic damped bearings;
3. having thus sensed the vibrations $V_I$, $V_{II}$, ... $V_i$ in the planes I, II, ... $i$, the following system may be set out:

$$a_{aI}x + a_{bI}y + \ldots + a_{nI}z = V_I$$

$$a_{aII}x + a_{bII}y + \ldots + a_{nII}z = V_{II}$$

$$a_{ai}x + a_{bi}y + \ldots + a_{ni}z = V_i$$

wherein the magnitude and argument of $x$, $y$ ... determine the intensity of the laser shots and their phase in the different planes $a$, $b$, ..., respectively.

In this case the processor will have to make a calculation, for instance according to the following sequence of operations which are valid for balancing in three planes:
(1) reset,
(2) laser position into the plane $a$,
(3) fire the laser, unitary intensity, angle 0°,
(4) vibration variation sensing in the planes I, II and III,
(5) influence coefficient determination and storing (magnitude and argument),

| | |
|---|---|
| 6) 7) 8) 9) | as at 2) to 5), but for the plane b, |
| 10) 11) 12) | as at 2) to 5), but for the plane c, |

-continued

13)

(14) sensing and storing the total vibrations $V_I$, $V_{II}$ and $V_{III}$ in the planes I, II and III, (15) solve the system $$a_{aI}x + a_{bI}y + a_{cI}z = V_I$$

$$a_{aII}x + a_{bII}y + a_{cII}z = V_{II}$$

$$a_{aIII}x + a_{bIII}y + a_{cIII}z = V_{III}$$

for $x$, $y$ and $z$ and storing $x$, $y$ and $z$, (16) position the laser into the plane $a$, (17) fire the laser a number of times according to the magnitude of $x$ and with a phase angle equal to the argument of $x$, (18) position the laser into the plane $b$, (19) fire the laser, a number of times according to the magnitude of $y$ and with a phase angle equal to the argument of $y$, (20) position the laser into the plane $c$, (21) fire the laser a number of times according to the magnitude of $z$ and with a phase equal to the argument of $z$, (22) sensing of the vibrations $V_I$, $V_{II}$, $V_{III}$, (23) if $V_I$, $V_{II}$, $V_{III}$ are:

(a) lower than the predetermined limit: stop, (b) higher than the predetermined limit: repeat as from 15).

Assuming that at each laser pulse for instance 1 mg of aluminium has to be removed, in normal operating conditions for ultracentrifuges a power of $10^7$W, concentrated onto a ½ mm² surface for 1 μsec is required. This is obtained by means of a normal pulse-type laser of medium power for industrial uses, for example of the ruby type, having an energy of 10–50 Joules and a pulse duration of 1–10 μsec, focalized onto an area of 0.1–1 mm diameter.

In the case of the above mentioned methods for addition rather than removal of material, it is clear that the illustrated procedure referring to the laser application is again valid with the exception that the operative stage of the operating means which replace the laser must be displaced by 180°, and the required correction for taking into account the "flight times" of the material to be added must be further made; in this case, however, for some particular applications it will be possible to increase the duration of said operative stage, thus reducing a possible operative critical state.

It is understood that this invention is not to be limited to the specific embodiments set forth herein, but it encompasses all the changes as falling within its scope.

What is claimed is:

1. A method for the dynamic balancing of a rotating body, particularly a centrifuge, while it is revolving within its own frame, wherein the vibration amplitude, frequency and phase of said rotating body are sensed at least within two planes of said body, so that vibration signals are produced, which are processed and converted into piloting signals, said method comprising the step of using these piloting signals to actuate means which vary the mass of the rotating body.

2. The method according to claim 1, wherein said means consist of means that emit electromagnetic energy directed onto said rotating body, to vary its mass by removal of material therefrom.

3. The method according to claim 1, wherein said means consist of means that emit electrons directed onto said rotating body, to vary its mass by removal of material therefrom.

4. The method according to claim 1, wherein said means consist of means that send particles, such as ions and ionised molecules, to vary the mass of said rotating body by addition of material thereto.

5. The method according to claim 1, further comprising the steps of: generating a reference signal indicative of the angular position of the rotating body; and comparing said vibration signals with such reference signal and normalizing the signals as to phase and amplitude, said processing operation to obtain the piloting signal being then carried out on the signals resulting from said comparing and normalizing step, while said signals obtained from the processing operation are also calibrated as to amplitude and phase.

6. The method according to claim 5, wherein said balancing operation is carried out in several cross sectional planes of the rotating body, by determining the relative influence coefficients which will be utilized to carry out the balancing operation, said influence coefficients being experimentally determined through said means.

7. The method according to claim 1, further comprising the step of combining said vibration signals with other signals of predetermined frequency, such as sinusoidal signals produced by a generator connected with the rotating body.

8. An apparatus for the dynamic balancing of a rotating body, particularly a centrifuge, while it is revolving within its own frame, wherein sensing means at least within two planes of the rotating body sense the amplitude, frequency and phase of its vibrations so that vibration signals are produced, and processing means, connected to the output of said vibration signals, convert them into piloting signals, said apparatus comprising means connected to the output of said processing means, which are operated by said piloting signals, and thus vary the mass of said rotating body.

9. The apparatus according to claim 8, wherein said means utilized to vary the mass of the rotating body consist at least of one laser device.

10. The apparatus according to claim 8, wherein said means utilized to vary the mass of the rotating body consist at least of one electronic gun.

11. The apparatus according to claim 8, wherein said means utilized to vary the mass of the rotating body consist at least of one electric discharge device.

12. The apparatus according to claim 8, wherein said means utilized to vary the mass of the rotating body consist at least of one ionisation device.

13. The apparatus according to claim 8, wherein said means utilized to vary the mass of the rotating body consist at least of one plasma jet device.

14. The apparatus according to claim 8, wherein said means utilized to vary the mass of the rotating body consist at least of one molecule beam gun.

15. The apparatus according to claim 8, wherein said means utilized to vary the mass of the rotating body act at least upon one annular belt fixed to said body.

16. The apparatus according to claim 8, further comprising; generator means for generating a reference signal indicative of the angular position of the rotating body; and comparing means, whose inputs are connected to said sensing means and to said reference signal generator means, at the outputs of said comparing means appearing phase and amplitude normalized signals which allow vibration amplitude, frequency and phase to be determined, said processing means then receiving at their input said signals appearing at the outputs of said comparing means.

17. The apparatus according to claim 16, wherein said processing means comprise manual amplitude and phase calibration means to influence the signals at the output of the processing means.

18. The apparatus according to claim 8, wherein said sensing means are disposed within several planes normal to the rotating body axis, said means, which vary the mass of the rotating body, being disposed into several planes normal to said axis, to carry out the balancing operation in several planes of said body, through the determination of the influence coefficients, said means which vary the mass of the rotating body being operated in a preliminary stage for determining said influence coefficients.

19. The apparatus according to claim 8, wherein said processing means are of the analogue type.

20. The apparatus according to claim 8, wherein said processing means are of the watt-meter type, and sinusoidal signal generator means are connected with the rotating body, said sinusoidal signal being combined with said vibration signal, one winding of said wattmeter being connected to said sensing means and the other to the sinusoidal signal generator means, respectively.

* * * * *

UNITED STATES PATENT OFFICE
CERTIFICATE OF CORRECTION

Patent No. __4,096,988__ Dated __June 27, 1978__

Inventor(s) __Giovan Battista Scuricini__

It is certified that error appears in the above-identified patent and that said Letters Patent are hereby corrected as shown below:

Column 6, line 32, delete "is" and insert --its--.

Column 7, line 53, before "multiplication", insert --(--.

Column 8, line 60, delete horizontal line.

Column 9, lines 2 and 4, delete horizontal lines.

Column 8, lines 61 - end, and Column 9, line

3, should be set out the same way as         Column 8, lines 53-59, i.e., bold face         type and proper bracketing of numbers         as follows:

UNITED STATES PATENT OFFICE
CERTIFICATE OF CORRECTION

Patent No. 4,096,988            Dated June 27, 1978

Inventor(s) Giovan Battista Scuricini

It is certified that error appears in the above-identified patent and that said Letters Patent are hereby corrected as shown below:

(6), (7), (8), (9)     as at (2) to (5), but for the plane b, (10), (11), (12), (13)     as at (2) to (5), but for the plane c, Column 9, line 26, after "phase" insert --angle--.

Signed and Sealed this

Tenth Day of April 1979

[SEAL]

Attest:

RUTH C. MASON
Attesting Officer

DONALD W. BANNER
Commissioner of Patents and Trademarks